United States Patent [19]

Hertz

[11] Patent Number: 5,195,019
[45] Date of Patent: Mar. 16, 1993

[54] BONDING FIRED MULTILAYER CAPACITORS INTO A STACK

[76] Inventor: Jerome J. Hertz, 451 Monument Dr., Apt. 1113, Jacksonville, Fla. 32225

[21] Appl. No.: 832,881

[22] Filed: Feb. 10, 1992

[51] Int. Cl.$^5$ .......................... H01G 4/38; H01G 7/00
[52] U.S. Cl. .................................... 361/328; 29/25.42
[58] Field of Search ............... 361/306, 308, 309, 310, 361/320, 321, 328, 329, 330; 29/25.42

[56] References Cited

U.S. PATENT DOCUMENTS

| | | | |
|---|---|---|---|
| 3,496,435 | 2/1970 | Manley | 361/306 |
| 3,689,811 | 9/1972 | Hoffman | 361/328 |
| 4,605,835 | 8/1986 | Deffeyes | 29/25.42 X |
| 4,777,558 | 10/1988 | Endo | 361/306 |

*Primary Examiner*—Donald A. Griffin

[57] ABSTRACT

A multiple capacitor assembly has a multiplicity of flat, prefired ceramic capacitor slabs each containing a plurality of spaced capacitor electrode plates. Each of the slabs has one side coated with an adhesive layer composed of a mixture of glass frit and a metal silicate. The coated slabs are superimposed on each other to form a stack. Upon firing the stack, the adhesive layers fuse and bond the slabs together. Electrically conductive terminal stripes are applied to sides of the stack to connect electrically with the electrode plates. Terminal leads are applied to the terminal stripes. A coating of glass frit paste is applied to the stack. Upon firing the stack, the terminal stripes bond to the sides of the stack; the terminal leads bond to the terminal stripes, and the glass coating fuses and forms a hermetically sealed encapsulation for the entire stack.

10 Claims, 3 Drawing Sheets

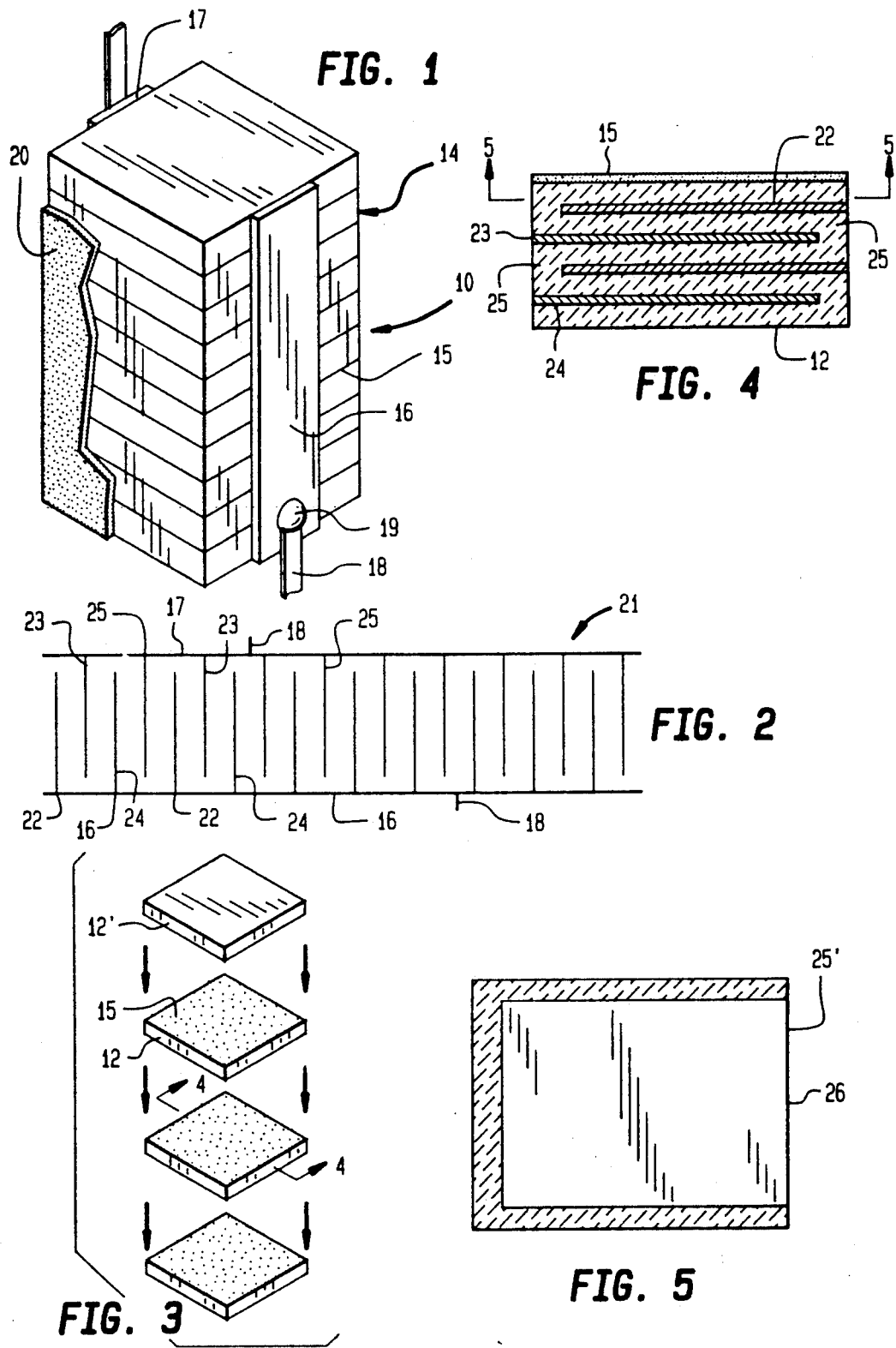
U.S. Patent    Mar. 16, 1993    Sheet 1 of 3    5,195,019

BONDING FIRED MULTILAYER CAPACITORS INTO A STACK

BACKGROUND OF THE INVENTION

1. Field of the Invention

This invention concerns monolithic multilayer capacitors and more particularly concerns bonding together a plurality of fired on monolithic multilayer capacitors.

2. Description of the Prior Art

Heretofore it has been conventional to fabricate multilayer ceramic capacitors with a plurality of electrode plates embedded in a ceramic dielectric chip. On many occasions it is desirous to take one or more fired multilayer capacitors and bond them together. When, however, glass frit is used as the bonding agent, the capacitors are very fragile and succumb to mechanical and thermal shocks by cracking and failing electrically.

SUMMARY OF THE INVENTION

The present invention overcomes the aforementioned fragility of prior assemblies of fired multilayer capacitors by assembling a multiplicity of prefired ceramic capacitors, each containing a plurality of electrode plates. A layer of a glass frit-metal silicate mixture is applied to one side of each prefired multilayer capacitor chip. Then the coated capacitors are assembled to form a stack. At this point the stack can be fired at a suitable firing temperature to set the pulverized glass or glass frit-metal silicate layer and produce a solid, permanent bond between all the abutted chips. The assembly can then be further processed by applying silver or other metal terminal stripes on sides of the fired stack to serve as contact terminals for the capacitor electrodes. The silver stripes can then be set by firing the stack once again. Electrical leads can then be soldered to the metal stripes. Thereafter the entire stack can be encapsulated in a glass enclosure. This is done by coating the stack with glass frit in a suitable liquid vehicle. The stack can be fired a third time to set the glass encapsulation. It has been found that the assembled thrice fired stack is very rugged and will resist mechanical and thermal shocks without cracking or degradation of electrical parameters. In a modification of the process, the assembly is performed with a single firing, to embody the stack of ceramic slabs, terminal stripes, and glass encapsulation in a monolithic structure, which has all the desirable properties of an assembly formed by a plurality of firings of a stack.

These and other objects and many of the attendant advantages of this invention will be readily appreciated as the same becomes better understood by reference to the following detailed description when considered in connection with the accompanying drawings in which:

BRIEF DESCRIPTION OF THE DRAWINGS

FIG. 1 is a isometric view on a greatly magnified scale of a stack of bonded miniature capacitors, according to the invention;

FIG. 2 is an electrical circuit diagram of a stack of capacitors of FIG. 1, showing of ceramic dielectric slabs being omitted;

FIG. 3 is an exploded isometric view of parts of the stack of FIG. 1, shown at one stage in the assembly process according to the invention;

FIG. 4 is a further enlarged cross sectional view taken along line 4—4 of FIG. 3;

FIG. 5 is a horizontal sectional view taken along line 5—5 of FIG. 4;

DESCRIPTION OF THE PREFERRED EMBODIMENTS

Figure 6:
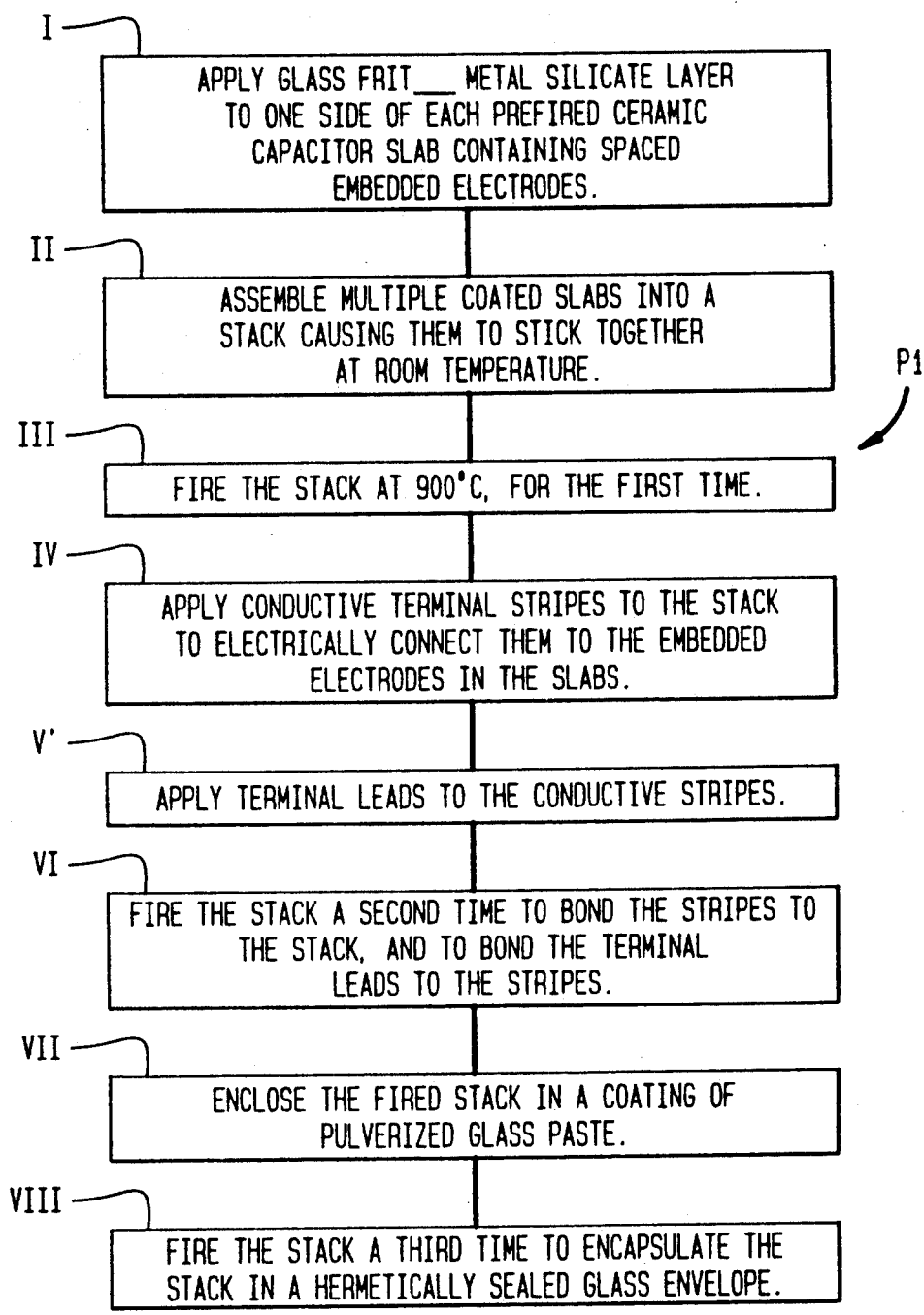
FIG. 6 is a block diagram listing essential steps in one process of assembly according to the invention.

Referring now to the drawings wherein like reference characters designate like or corresponding parts throughout, there is illustrated in FIG. 1 a stack or pile generally designated as numeral 10 of prefired ceramic slabs or chips 12 which are capacitors 14. The stack 10 is shown at one stage in a preferred assembly process described below. The slabs 12 are bonded together at room temperature by an individual adhesive layer 15 composed of a mixture of glass frit and a metal silicate. After the stack 10 is fired, metal terminal stripes 16 and 17 are applied thereto. The stripes 16, 17 are composed of a paste of silver of someother noble metal. The stack 10 as shown in FIG. 1 has been fired a second time. Then lead wires 18 are applied by high temperature solder 19 to the terminal stripes 16 and 17.

Thereafter the entire stack 10 is coated with a paste composition containing glass frit, and the stack is fired a third time to produce a transparent glass encapsulation 20. The glass encapsulation 20 is broken away in FIG. 1 to show construction of the encapsulated stack 10. FIG. 2 shows the electrical circuit diagram 21 of stack 10. The circuit 21 has a plurality of laterally spaced electrodes 22, 23, 24 and 25 alternately connected to terminal stripes 16 and 17. Lead wires 18 are connected to the respective stripes 16, 17. The showing of the ceramic bodies in which the electrodes 22, 23, 24 and 25 are embedded is omitted to simplify the drawing.

FIG. 3 shows a stage in the assembly process, some of the prefired ceramic slabs or chips 12 being omitted. On one side of each of slabs 12 except the uppermost slab 12' is applied the adhesive layer 15 containing a mixture of glass frit and a metal silicate. Suitable metals for silicate are Na, Po, Li, LiAl, MgAl, K, Zn, etc.

FIGS. 4 and 5 show the internal construction of each slab 12 included in the ceramic prefired dielectric body 25 in which are embedded the flat capacitor electrode plates 22, 24. Each plate has an end 26 which terminates at either one of the conductive terminal stripes 16 or 17. The paste layer 15 which contains the glass frit and metal silicate is shown applied to the top surface of each slab.

FIG. 6 shows the essential steps I–VII of a preferred process P1 for assembling a plurality of prefired multilayer ceramic chip bonded together by a glass frit-metal silicate and encapsulated in a glass frit. In step I, the glass frit-metal silicate layer 15 is applied to one side of each prefired multilayer ceramic capacitor slab 12 containing spaced embedded electrodes 22, 23, 24 and 25; see FIGS. 3, 4 and 5. In step II, a multiplicity of coated slabs or chips are assembled into the stack 10 at room temperature; see FIG. 1. In step III, the stack 10 is fired to set the adhesive glass frit-metal silicate layers and bond the slabs or chips 12 permanently together as shown in FIG. 1. In step IV, the conductive terminal stripes 16 and 17 are applied to connect electrically alternate zones of the electrodes 22, 23, 24 and 25 to the stripes 16, 17; see FIG. 2. In step V, the lead wires 18 are connected by high temperature fusing solder 19 to the terminal stripes 16 and 17; see FIG. 1. In step VI, the stack 10 is fired a second time to set and bond the terminal stripes 16 and 17 to the stack 10, and to bond the terminal leads 16, 17 to the terminal stripes 16, 17. In step VII, the twice fired stack 10 is enclosed in the coating or enclosure 20 or pulverized glass paste. In step VIII, the stack 10 is fired a third time to encapsulate the stack 10 in a hermetically sealed envelope which protects it and shields it from ambient, environmental conditions.

Figure 7:
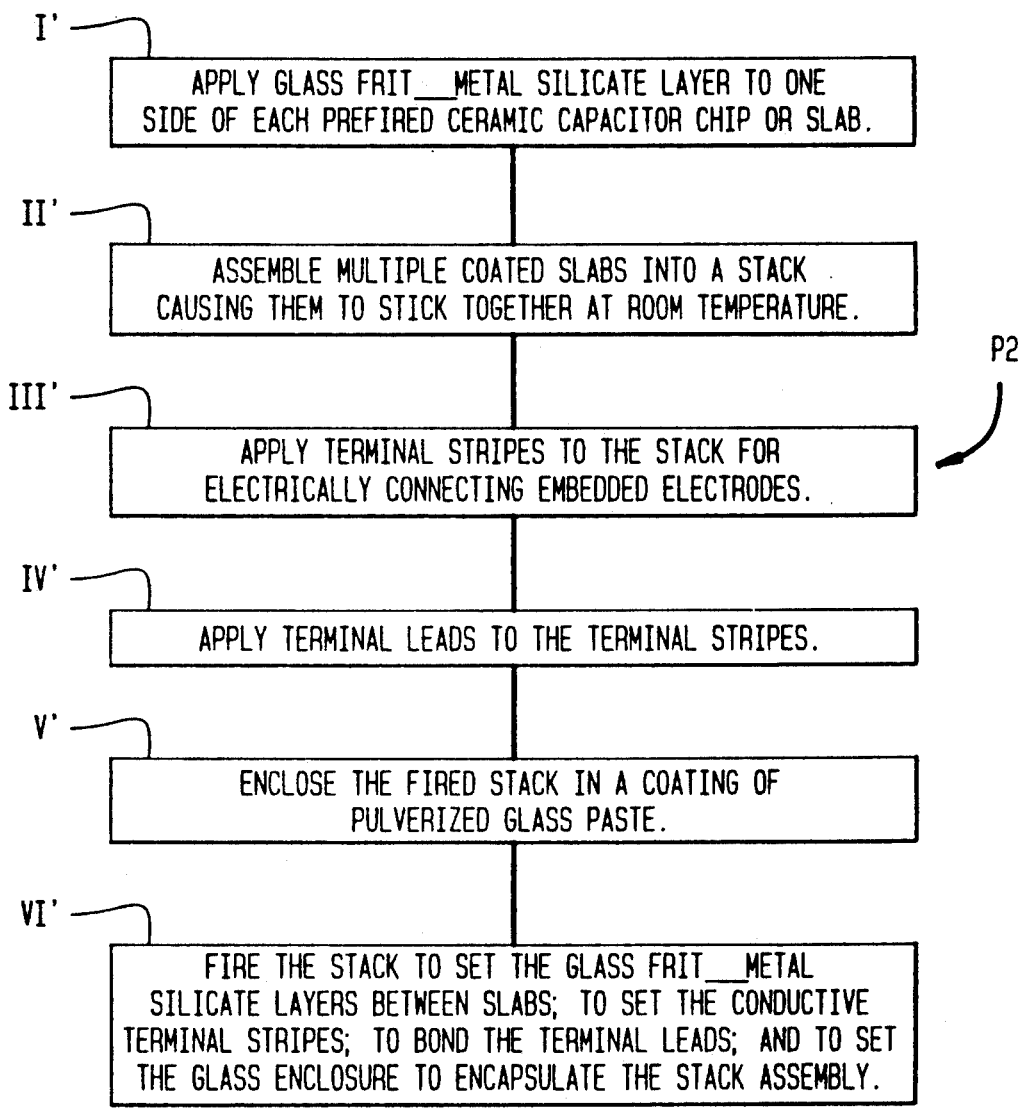
FIG. 7 is a block diagram listing essential steps of a modified process, according to the invention.

In FIG. 7 are shown essential steps I'-VI' of a modified process P2 which also can result in a bonding together of a plurality of prefired multilayer ceramic capacitors in a glass frit-metal silicate which is encapsulated in a glass frit. In step I', the glass frit-metal silicate layer 15 is applied to one side of each prefired multilayer ceramic capacitor slab 12 each containing spaced electrodes 22, 23, 24 and 25; see FIGS. 3, 4 and 5. In step II', a multiplicity of slabs or chips 12 each coated with the adhesive layer 15 are assembled into the stack 10 at room temperature. The slabs stick together and do not come apart readily even though the adhesive layers 15 have not yet been fired In step III', the terminal stripes 16, 17 are applied to sides of the stack 10 to connect alternate embedded electrodes 22, 23, 24 and 25 as illustrated in FIG. 2. In step IV', terminal leads 18 are applied with hard, high temperature solder 19 to the terminal stripes. In step VI', the stack is fired at 900° C. to set the glass frit-metal silicate layers 15; to set the conductive terminal stripes 16, 17; to bond the solder 19 of terminal leads 18; and to set the glass enclosure and form the hermetically sealed encapsulation 20.

In the present invention, a unique mixture of materials is employed. The glass frit-metal silicate layers are appliable at room temperature and will adhere with sufficient strength to keep the slabs together subject to further processing. The subsequent firing of the stack of layers with adhesive layers therebetween sets the layers to form a strong, permanent bond of the slabs or chips to each other. The bonding material has been found compatible with all ceramic dielectrics conventionally used in the art and matches them coefficient of expansion to permit additional firings of silver terminations 16, 17 without thermal degradation or thermal cracking. Any size chips 12 and any desired number of chips may be so bonded to form the stack 10.

It has been found unexpectedly that the thermally bonded chips in the stack 10 have improved thermal shock resistance. When individual capacitor chips are heated to set the terminal leads, thermoshock cracking frequently occurs when the chips are immersed in solder baths or are subjected to temperature differentials of 100° C. or more. Unexpectedly in the present invention, the bonded, glass-silicate coated thermally bonded chips are able to withstand temperature changes of up to 350° C. without cracking. The leads 18 are attachable with high temperature solder 19 directly to the thermally bonded terminal stripes. Conventionally, multi-attached chips must be mechanically attached to the leads because the chips are not bonded. The use of high temperature solder is limited because of thermal shock causing cracks between the leads or leads frame brackets and the chips, due to thermal coefficient of expansion differences. In the present invention clean up of solder flux is not required as in conventional processes. Nonfluxing solder is used in the present invention which simplifies the lead attachment process. The encapsulation of the stacks in hermetically sealed glass enclosures 20, protects the stacks against ambient temperature changes, solvents, and other adverse environmental conditions.

The silicates referred to above preferably employ metals which have positive ions such as lead, cadmium, aluminum, zinc, magnesium, lithium, potassium, etc., and combinations of these metals such as lithium aluminum, magnesium aluminum, etc., which provide positive ions or combinations of positive ions. The possible ranges of mixture compositions for adhesive layers 15 are from 95% glass-5% silicate to 5% glass-95% silicate.

It should be understood that the foregoing relates to a limited number of preferred embodiments of the invention which have been by way of and that it is intended to cover all changes and modifications of the examples of the invention herein chosen for the purpose of the disclosure, which do not constitute departures from the spirit and scope of the invention.

What is claimed:

1. A multiple capacitor assembly, comprising:
    a multiplicity of multilayer capacitors;
        each of said capacitors having a prefired ceramic body with flat opposite sides;
        each of said ceramic bodies containing a plurality of spaced electrode plates;
    an adhesive layer coating on one side of each of said ceramic bodies;
    said ceramic bodies being superimposed on one another with said adhesive layers disposed therebetween to form a stack; and
    said adhesive layers being composed of a mixture of glass frit and a metal silicate, to bond said ceramic bodies together at room temperature to form a monolithic stack of said capacitors.

2. A multiple capacitor assembly as claimed in claim 1, wherein said metal is in the form of electrically positive ions such as those of lead, cadmium, aluminum, zinc, magnesium, lithium, potassium, and the like.

3. A multiple capacitor assembly a claimed in claim 2, wherein said mixture contains glass frit and metal silicate in the range of 95% glass, 5% metal silicate to 95% metal silicate and 5% glass.

4. A multiple capacitor assembly as claimed in claim 2, further comprising electrically conductive terminal stripes applied to portions of said stack to make direct electrical contact with alternate ones of said electrode plates in each of said ceramic bodies, said stripes being fired to fuse them to said stack.

5. A multiple capacitor assembly as claimed in claim 2, further comprising electrically conductive terminal stripes applied to portions of said stack to make direct electrical contact with alternate ones of said electrode plates in each of said ceramic bodies; and circuit terminal leads attached to said terminal stripes respectively, said stripes and said leads being fired to fuse said stripes to said stack and to fuse said leads to said terminal stripes.

6. A multiple capacitor assembly as claimed in claim 5, further comprising a coating of glass enclosing said stack, said coating being fired to encapsulate said stack in a hermetically sealed permanent enclosure to shield and protect said capacitors from adverse ambient conditions.

7. A process for producing a multiple capacitor assembly, comprising the steps of:
    applying a glass frit-metal silicate adhesive layer to one side of each of a multiplicity of prefired multilayer capacitor slabs; each of said slabs containing spaced electrode plates;

superimposing said slabs upon one another to form a stack with an adhesive layer between each pair of abutting slabs; and firing said stack to set said adhesive layers and cause said slabs to be permanently bonded in said stack.

8. A process as claimed in claim 7, further comprising applying conductive terminal stripes to sides of said stack to electrically connect said stripes to said electrode plates in said slabs;

applying circuit terminal leads to said stripes; and firing said stack to bond said terminal stripes to said stack, and to bond said terminal leads to said stripes.

9. A process as claimed in claim 7, further comprising: enclosing said stack in a coating of pulverized glass paste; and firing said stack to fuse and bond said coating to said stack to form an encapsulation which protects said capacitors assembly from adverse ambient conditions.

10. A process for producing a multiple capacitor assembly, comprising the steps of:

applying a glass frit-metal silicate adhesive layer to one side of each of a multiplicity prefired multilayer capacitor slabs, each slab containing a plurality of spaced electrode plates;

superimposing said slabs upon one another to form a stack with an adhesive layer between each pair of abutting slabs;

applying conductive terminal stripes to sides of said stack to electrically connect said stripes to said electrode plates in said slabs;

applying circuit terminal leads to said terminal stripes;

enclosing said stack in a coating of pulverized glass paste; and firing said stack to fuse and bond said slabs to each other to form a monolithic block; to bond said conductive terminal stripes to said block; to bond said terminal leads to said conductive terminal stripes; and to set said coating to form an encapsulation for said block to protect the same from adverse ambient conditions.

* * * * *